April 17, 1956  J. M. KENDALL  2,742,633
DEVICE FOR MEASURING MINUTE LINEAR MOVEMENT
Filed April 2, 1953  3 Sheets-Sheet 1

INVENTOR
JAMES M. KENDALL

BY
ATTORNEYS

April 17, 1956      J. M. KENDALL      2,742,633

DEVICE FOR MEASURING MINUTE LINEAR MOVEMENT

Filed April 2, 1953      3 Sheets-Sheet 2

INVENTOR
JAMES M. KENDALL

ATTORNEYS

April 17, 1956   J. M. KENDALL   2,742,633
DEVICE FOR MEASURING MINUTE LINEAR MOVEMENT
Filed April 2, 1953   3 Sheets-Sheet 3
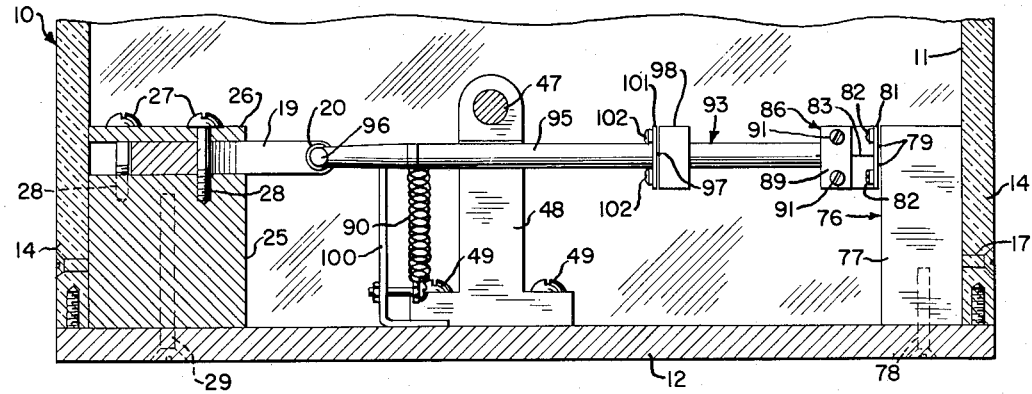
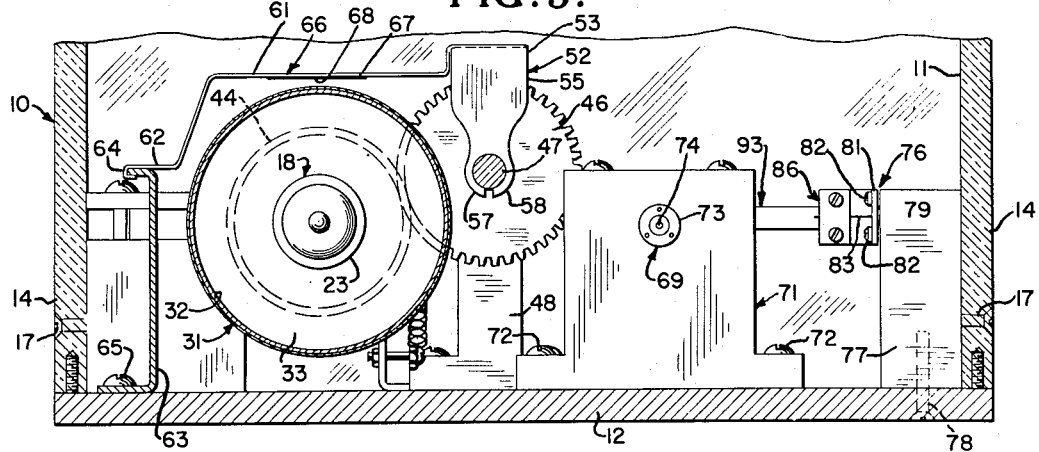
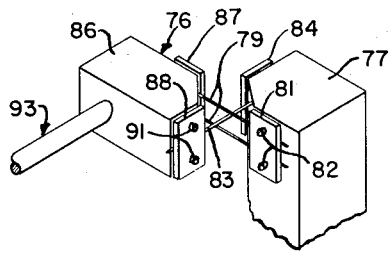
INVENTOR
JAMES M. KENDALL
ATTORNEYS

United States Patent Office 2,742,633
Patented Apr. 17, 1956

2,742,633

DEVICE FOR MEASURING MINUTE LINEAR MOVEMENT

James M. Kendall, Washington, D. C., assignor to the United States of America as represented by the Secretary of the Navy Application April 2, 1953, Serial No. 346,529

8 Claims. (Cl. 340—187)

(Granted under Title 35, U. S. Code (1952), sec. 266)

The invention described herein may be manufactured and used by or for the Government of the United States of America for governmental purposes without the payment of any royalties thereon or therefor.

The present invention relates to a gauge and more particularly to a measuring device.

More particularly, the invention is concerned with improvements in measuring devices wherein means are provided for measuring the movement of an object remotely located from the measuring device, and which are employed in the making of minute linear translational measurements the accuracy of which may be in the order of a ten thousandth to a hundred thousandth of an inch. Furthermore, the invention provides a novel and improved measuring device which will be reliable and efficient in operation for effecting fine linear measurements.

An object of the present invention is to provide a new and improved measuring apparatus.

Another object of the invention is the provision of a measuring device comprising in combination both mechanical and electrical means for accurately measuring and indicating for visual inspection the most minute movements of a movable object.

Still another object of the invention is the provision of a measuring device wherein means are provided for measuring the movement of an object whereby the drag force associated with the impingement of a fluid current on the object may be ascertained.

A still further object of the invention is the provision of a measuring device wherein means are provided for indicating and measuring the movement of an object disposed within a fluid current and remotely located from the measuring device.

Another object of the invention is the provision of a measuring device wherein means are provided for measuring the magnitude of a force exerted on a remote object including a pair of variable reactance devices electrically interconnected, one of said reactance devices being adapted to have its reactance stabilized in accordance with the magnitude of the force to be measured and the other reactance device being manually adjustable to obtain a reactance therein equal to the reactance established by the magnitude of the force, electronic means for indicating the equality of reactances in the pair of transformers, and calibrated means for indicating the magnitude of the force.

Other objects and many of the attendant advantages of this invention will be readily appreciated as the same becomes better understood by reference to the following detailed description when considered in connection with the accompanying drawings wherein:

Fig. 4 is a fragmentary sectional view taken on the line 4—4 of Fig. 1;

Fig. 5 is a fragmentary sectional view taken on the line 5—5 of Fig. 1;

Fig. 6 is a fragmentary perspective view of the step down lever and flexible support therefor;

Fig. 7 is a detailed perspective view of the guide bracket and the wire link connection associated therewith; and, Fig. 8 is a diagrammatical view of a circuit arrangement suitable for use with the present invention, the electronic equipment thereof being shown in block form.

Figure 1:
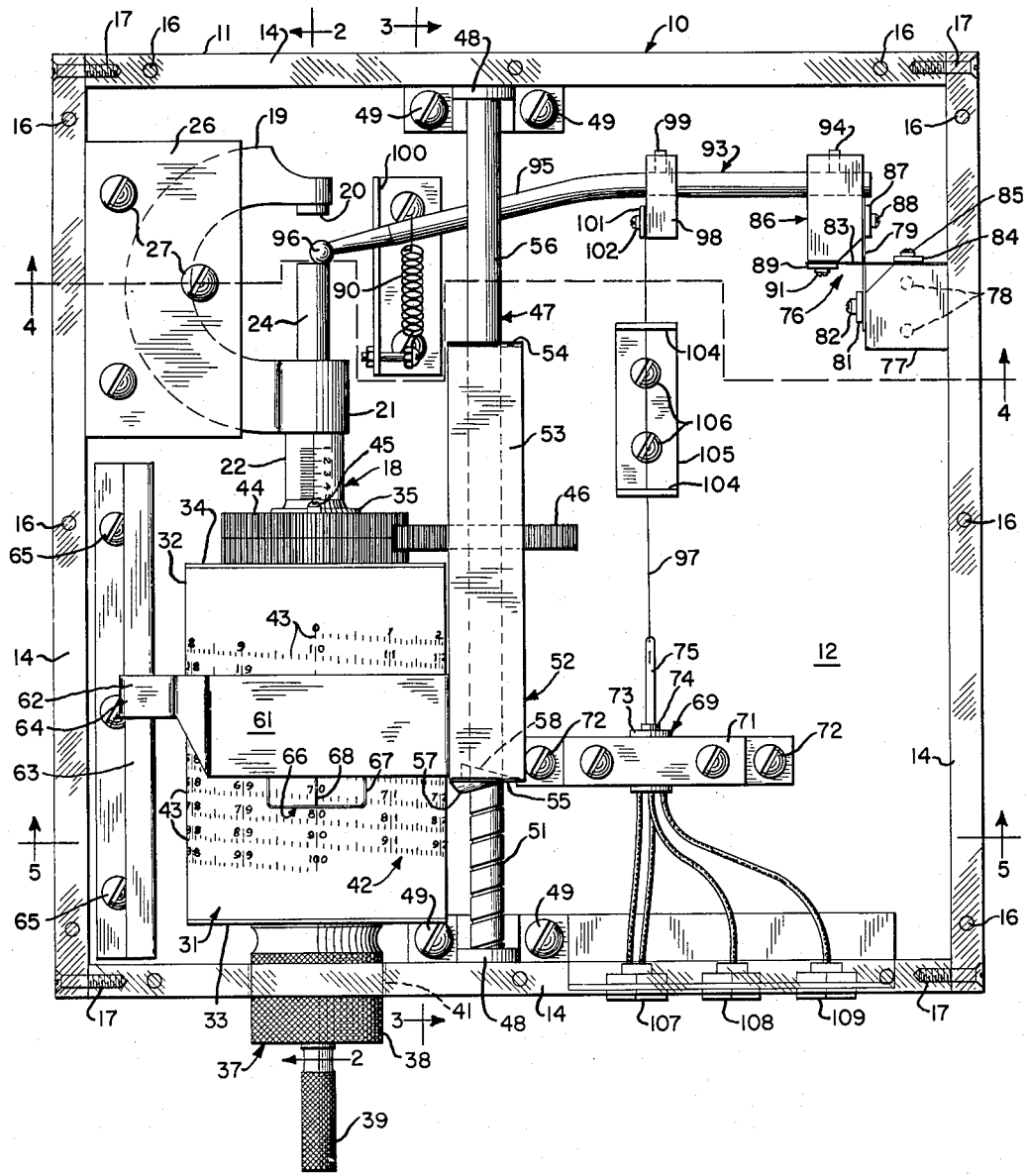
Fig. 1 is a plan view of the device of the present invention with the cover removed.

Referring now to the drawings and more particularly to Fig. 1 thereof, the numeral 10 generally indicates the measuring device or reader similar to the reader disclosed in my copending application, Serial No. 310,573, filed September 19, 1952, titled Precision Balance. The device comprises a casing 11 having a bottom 12 composed of any material suitable for the purpose such, for example, as aluminum or the like, the bottom supports thereon and has secured thereto, as by screw 13, side walls 14. A cover 15 is supported on and secured to the side walls 14 by screws 16, the side wall being secured together by screws 17. Furthermore, the side walls 14 and cover 15 are composed of suitable transparent material such, for example, as "Lucite," plate glass or the like.

As more clearly shown on Fig. 1 a micrometer generally indicated by the reference character 18 is arranged within the casing 11 and comprises a frame 19 having an anvil 20 and a bearing 21 which fixedly supports a barrel 22. A thimble member 23 is rotatably supported on the barrel and is provided with a spindle 24 rotatably supported within the barrel 22 and bearing 21. It will be understood that any conventional means may be employed for causing longitudinal movement of the spindle 24 as the thimble 23 is rotated such, for example, as by a nut carried by the barrel and having threaded engagement with a threaded portion of the spindle, similar to the arrangement employed in a conventional micrometer. The micrometer 18 is rigidly supported by a block 25 and plate 26 by arranging the frame 19 of the micrometer between the block and plate and clamping the frame therebetween by means as screws 27, the screws being threaded into suitable openings 28 formed in the block and the block being secured to the base 12 by screws 29, Fig. 4.

A drum generally indicated by the numeral 31 is rotatably supported on the thimble 23 and comprises a cylinder 32, the ends of the cylinder being closed by a pair of discs 33 and 34 respectively. The disc 34 has formed thereon a hub or sleeve 35, the sleeve being fixedly secured to the portion 36 of the thimble 23 in any suitable manner such, for example, as by a press fit. The disc 33 is provided with an actuating member 37 comprising a pair of knurled grip members 38 and 39, the grip member 38 being arranged in and extending through an opening 41 formed in one of the side walls 14, Fig. 2. By this it will be understood that means are provided whereby the drum 31 may be rotated at a relatively high rate of speed or a greatly reduced rate of speed. Furthermore, upon rotation of the drum by either of the grip members 38 or 39, longitudinal movement is imparted thereto by the aforesaid micrometer arrangement.

As more clearly shown on Fig. 1 the drum 31 is provided with a scale 42 in the form of a helix, the helical convolution of the scale being indicated by the reference character 43 and is calibrated throughout the length thereof from 0 to 100. The total length of the scale is approximately 62.8 inches and thus a thousandth of an inch of movement of an object is represented by about ⅝ inch of scale length. Thus by the aforesaid scale arrangement it is possible to make minute linear measurements which may be in the order of a ten thousandth to a hundred thousandth of an inch. Furthermore, the drum mounted on the micrometer thimble is adapted to be rotated ten revolutions for the full scale motion of 0.100 in movement of an object. Thus it will be understood that smallest divisions on the scale correspond to one ten thousandth of an inch of movement of a movable object. By the aforesaid scale and micrometer arrangement it is possible to determine an amount of movement of an object with an accuracy to within a hundred thousandth of an inch.

Figure 2:
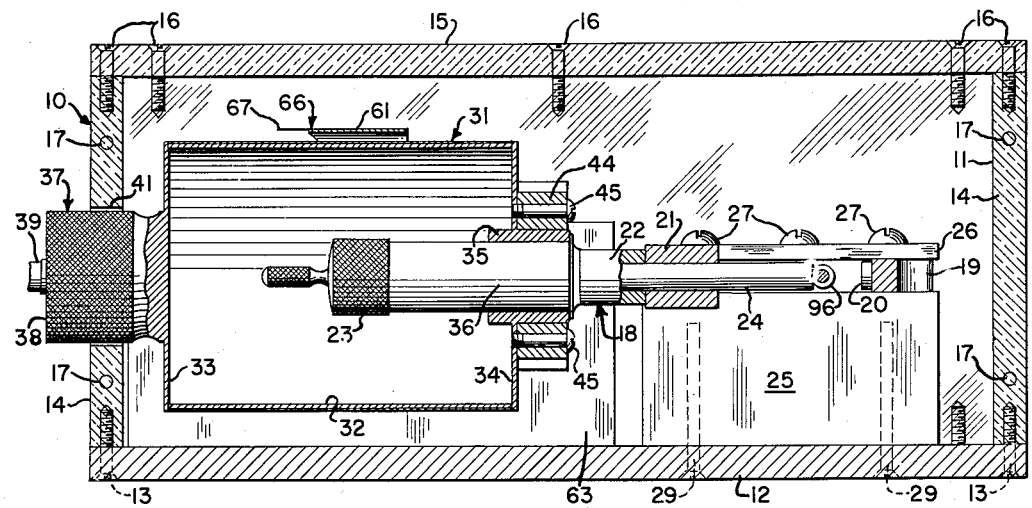
Fig. 2 is a sectional view taken on the line 2—2 of Fig. 1.
Figure 3:
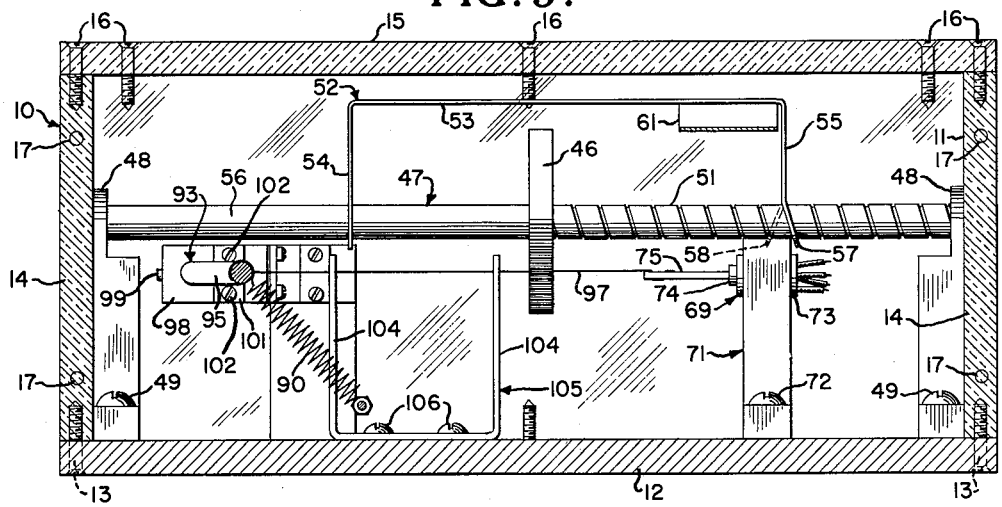
Fig. 3 is a sectional view taken on the line 3—3 of Fig. 1.

As shown more clearly on Fig. 2 a gear 44 is pressed on the sleeve 35 and secured to the end wall 34 of the drum by screws or the like 45. Gear 44 meshes with a gear 46 secured to a shaft 47 rotatably supported by a pair of bearings 48, the bearings being secured to the base by screws 49. The shaft 47 is provided with a feed screw portion 51 and slidably supports a U-shaped carriage 52. The carriage comprises a bridge member 53 having a pair of mutually spaced legs 54 and 55 carried thereby, leg 54 being supported by the smooth portion 56 and leg 55 being supported on the feed screw portion 51 of the shaft. Furthermore, leg 55 is provided with a pair of guide legs 57—58 arranged in the spiral grooves 59 of the feed screw 51 whereupon the carriage is moved in either one direction or the other in accordance with the direction of rotation of the drum by the actuating member 37.

A follower 61 is disposed above the drum 31 having one end thereof secured to or formed on the bridge member 53, the other end 62 thereof being slidably arranged on a guide member 63 as at 64. The guide member 63 is secured to the base 12 in any suitable manner such, for example as by screws 65, Figs. 1 and 5. Secured to the follower 61 such, for example as being welded thereto is an indexing element 66 comprising a U-shaped frame 67 having a centrally disposed index finger 68 mounted thereon and arranged coincidentally with respect to the longitudinal axis of the drum.

A linear variable differential transformer generally indicated by the reference character 69 is mounted in a support 71 composed of "Bakelite," the support being secured to the base 12 in any suitable manner, preferably by screws or the like 72. The transformer comprises a coil structure 73 having an armature 74 slidably arranged therein to which is secured a shaft 75 composed of any suitable non-magnetic insulating material such, for example, as wood, plastic or the like.

As more clearly shown on Figs. 1 and 6 a flexible support 76 is arranged within the casing 11 and comprises a member 77 secured to the base 12 as by screws 78. A pair of mutually spaced flexible elements 79 are clamped to one surface of the member 77 by a plate 81 and screws 82 and a flexible element 83 disposed at a right angle with respect to the flexible elements 79 and arranged therebetween is clamped to the other surface of the member 77 by a plate 84 and screws 85. The flexible elements 79 and 83 are secured to and support on member 86, the elements 79 are secured to one surface thereof by a plate 87 and screws 88, the elements 83 being secured to the other surface thereof by a plate 89 and screws 91.

A pivotally mounted spindle follower or step down device generally indicated by the reference character 92 is supported by the member 86 and comprises a lever element 93 secured to the member 86 as at 94. As more clearly shown on Fig. 1 the lever 93 is bent slightly as at 95 and has formed thereon a ball 96 in abutting engagement with the end of the micrometer spindle 24, the ball being disposed between the end of the spindle and the anvil 20 and maintained in abutting engagement with the spindle by a spring 90. One end of the spring 90 is secured to the lever 93, the other end of the spring 90 being secured to a guide bracket 100, the guide bracket being adapted to slidably support the lever 93.

The armature 74 of the transformer 69 is connected to the follower 92 by a relatively fine wire 97, one end of the wire being secured to the shaft 75, the other end thereof being secured to the follower 92 by a clamping arrangement comprising a member 98 secured to the follower as at 99 and a plate 101 secured to the member 98 as by screws 102, the wire being clamped between the aforesaid member 98 and the plate 101 and arranged in a pair of guide openings 103 formed in the legs 104 of a bracket 105 which is secured to the base by screws 106.

It will be understood, however, that the micrometer arrangement is adapted to move the armature 74 of the transformer 69 through the 2.5 to 1 step down arrangement as the micrometer thimble 23 and spindle 24 is rotated and moved longitudinally in response to the rotation of the drum by the actuating member 37. Furthermore, since the drum is mounted on the thimble the drum will also move longitudinally as it is rotated. Upon rotation of the drum rotative movement is imparted to the feed shaft 47 through gears 44—46 whereupon the carriage 52 is moved slidably along the feed shaft by reason of the aforesaid guide lug and feed screw arrangement. Thus the indexing element 66 carried by the follower 61 and secured to the carriage 52 is moved along the scale 42 on the drum as the carriage is moved slidably along the feed shaft 47 and the drum is rotated and moved longitudinally. However, one revolution of the micrometer thimble 23 corresponds to 0.010 of an inch of movement of the transformer armature 74. Furthermore, the total length of the helical scale 42 is substantially 62.8 inches whereupon a thousandth of an inch of movement of an object is represented by about ⅝ of an inch of scale length. By the aforesaid scale arrangement it is possible to determine the amount of movement of an object accurately to within a hundred thousandth of an inch.

As more clearly shown on Fig. 1 one wall of the casing 11 has mounted thereon plugs 107, 108 and 109, electrically connected to the transformer 69 by suitable conductor whereupon means are provided for establishing an external electrical connection from the transformer 69 to any suitable electronic equipment and balance device such, for example, as the arrangement shown and claimed in my copending application Serial No. 310,573, filed September 19, 1952, titled, Precision Balance.

Figure 8:
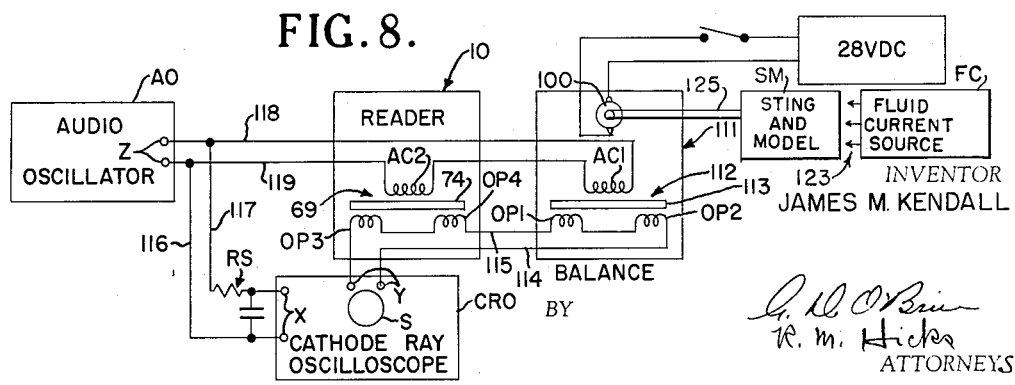

For a more complete understanding of the operation of the reader or measuring device attention is called to the circuit arrangement of Fig. 8 wherein the precision balance is indicated by the reference character 111. The balance is provided with a variable reactance device or linear variable differential transformer 112 which is identical in structure to the transformer 69 associated with the reader or measuring apparatus 10. It will be noted that the transformer 112 comprises a primary coil AC1, a pair of secondary coils OP1 and OP2 and an armature or core 113 arranged therebetween, the armature being operatively connected to the movable system or the force responsive means 100 of the balance 111 and adapted to be moved an amount proportionally to the movement of the movable system, resulting in a reactance change therein proportional to the magnitude of the force exerted on the movable system. It will be understood that the movable system is actuated through a mechanical linkage 125 by the sting carrying a model, indicated generally as SM, in response to impingement on the model of the fluid current, indicated generally as 123, from a fluid current source FC. The transformer 69 comprises a primary coil AC2, a pair of secondary coils OP3—OP4, the armature or core thereof being arranged between the primary and secondary winding of the transformer. The output or secondary coils OP1—OP2 of transformer 112 and the output coils OP3—OP4 of transformer 69 are electrically differentially interconnected and are connected in series across the Y terminals of the cathode ray oscilloscope CRO by conductors 114—115. Thus by this arrangement the resulting voltage which is the vector sum of both pair of output coils is fed to the Y terminals of the aforesaid oscilloscope over conductors 114—115. It will be noted that the X terminals of the oscilloscope are connected to the audio oscillator AO through the conductors 116—117 and the resistance-capacitor network RS to provide a 90° phase shift. The coils AC1 and AC2 of the transformers 69—112 are connected to the terminals Z of the oscillator AO by conductors 118—119 and are energizable thereby to develop an induced electromotive force or voltage in the secondary windings of transformers 69—112. By the aforesaid arrangement it will be understood that when the electronic system and balance is in operation an elliptical trace will appear on the screen S of the oscilloscope while the transformers 69—112 remain in an unbalanced condition. Furthermore, when the vector difference of the aforesaid output of the coils is zero the Y deflection is likewise zero and thus the ellipse collapses to a horizontally straight line. When this occurs an electrical balance has been obtained, the response of the electrical balance system being substantially instantaneous. In order to obtain an electrical balance it is necessary to rotate the micrometer thimble 23 and reader drum until the armature 74 of transformer 69 is moved an amount corresponding to the movement of armature 113 of transformer 112. When this occurs the reactances of the transformers 69—112 are equal, resulting in equal voltage induction in the secondary windings of transformers 69—12 and producing a balanced condition therebetween, and the zero voltage difference resulting therefrom causes the elliptical trace to collapse and form a horizontal trace line on the oscilloscope screen S. After collapse of the elliptical trace on the screen S a reading of scale 43 is taken.

By comparing the scale reading with a suitable calibrated curve it is possible to precisely determine the drag force on the model arranged within a fluid current. Furthermore, it will be understood that the balance is calibrated by applying known forces to an object, balancing the electrical system for each force, and reading the scale on the drum to the nearest one-hundred thousandth of an inch.

From the foregoing, it will be apparent that the invention provides a new and improved measuring apparatus which will be reliable and efficient in operation for effecting fine linear measurements of a movable object, wherein both mechanical and electrical means are employed for accurately measuring and providing for visual inspection of the most minute movement of a movable object in accordance with the balance condition of a pair of linear variable differential transformers.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. A measuring device comprising a micrometer having a rotatable thimble and a spindle rotatable with the thimble, means for imparting longitudinal movement to said thimble and spindle as the thimble is rotated, a rotatable drum secured to and movable longitudinally by said thimble as the thimble is rotated by said drum, means including a movable element operatively connected to said spindle and adaptable to be moved by the longitudinal motion of said spindle a predetermined amount upon each revolution of said spindle, and means including a helical scale on said drum for indicating the amount of movement of said movable element.

2. A measuring device comprising a micrometer having a rotatable thimble and a spindle rotatable with the thimble, threaded means on said spindle for imparting longitudinal movement to said thimble and spindle as the thimble is rotated, a rotatable drum secured to said thimble and movable longitudinally therewith as the thimble and spindle is rotated by said drum, a movable element, a step-down device mechanically linking said movable element to said spindle for moving said movable element a proportionally reduced distance with respect to the longitudinal distance traversed by said spindle, said step-down device being driven by the linear movement of said spindle to cause movement of said movable element, a helical scale on said drum, and means including a follower operatively connected to said drum and movable longitudinally along said scale as the drum is rotated for indicating said movement of the movable member.

3. A measuring device comprising a micrometer having a rotatable thimble and a spindle rotatable with the thimble, means including a threaded portion on said spindle for imparting longitudinal movement to said thimble and spindle as the thimble is rotated, a rotatable drum secured to said thimble and movable longitudinally thereby as the thimble and spindle are rotated by said drum, a linear variable differential transformer having primary and secondary windings, a source of energizing potential connected to said primary winding to induce an electromotive force in said transformer, an armature movably arranged within said transformer, a step-down device having a lever in engagement with said spindle and connected to said armature for moving said armature upon movement of said spindle to thereby vary the induced electromotive force in said transformer by movement of said spindle, said step-down device reducing the amount of movement of the armature with respect to the movement of said spindle, a helical scale on said drum, a follower operatively connected to said drum and movable longitudinally along said scale as the drum is rotated, and indexing means on said follower for indicating said movement of the armature.

4. A measuring device comprising a casing, a micrometer having a frame secured to said casing, means for securing said frame to said casing, a barrel fixed to said frame, a thimble rotatably supported on said barrel, a spindle carried by said thimble and arranged within said barrel, rotatable drum secured to said spindle for imparting rotative movement to said thimble, means on said barrel and operatively connected to said spindle for moving said thimble, spindle and drum longitudinally as the drum is rotated, means on said drum for rotating the drum, a helical scale on the drum, a plurality of minute calibrations on said scale, a slidably mounted carriage arranged within the casing, a rotatable shaft for slidably supporting said carriage, a gear train operatively connected to said drum and shaft for rotating the shaft in response to rotation of the drum, means on said shaft in engagement with the carriage for imparting sliding movement to said carriage as the shaft is rotated, a force responsive movable system upon which forces are exerted, a first variable reactance device having a movable component for varying the reactance of said device, said component being operatively connected to said system and movable by said system an amount proportional to the movement of said system in response to a force exerted thereon whereby the reactance of said device is stabilized in accordance with the magnitude of the force exerted on said system, a second variable reactance device having a selectively adjustable reactance varying element, said reactance devices being differentially electrically interconnected so that the resultant output of said devices is in a balanced condition when their reactances are equal, electronic means coupled to the output of said devices for indicating a balanced condition when the reactances of said devices are equal, a motion transmitting member interconnecting said spindle and said adjustable element for moving said element in unison with the longitudinal movement of said spindle whereby the reactance of said second device may be selectively varied by rotation of said drum to obtain a reactance value therein which is equal to the reactance established in said first device by the magnitude of the force exerted on said movable system, a follower mounted on said carriage and movable along said scale as the drum is rotated, and indexing means carried by said follower for indicating on said scale the distance traversed by said adjustable element in obtaining a balanced condition indication on said electronic means, the indicated distance traversed by said adjustable element being representative of the magnitude of the force exerted on said movable system.

5. A measuring device comprising in combination, a movable system, a linear measuring device, an armature slidably arranged within said measuring device and operatively connected to said system and movable an amount proportional to the movement of the system, means responsive to a fluid current for moving said system, a second linear measuring device, a core slidably arranged within said second named measuring device, means including a rotatable drum operatively connected to said core for moving said core, electronic means including a circuit arrangement operatively connected to said measuring devices for indicating a balance condition therebetween when said core has been moved an amount proportional to the movement of the armature, a helical scale on said drum, a follower operatively connected to said drum and movable along said scale as the drum is rotated, and indexing means carried by said follower for indicating the movement of said movable system when said balance condition has been obtained.

6. A measuring device comprising in combination, a movable system, a linear measuring device, an armature slidably arranged within said measuring device and operatively connected to said system and movable an amount proportional to the movement of the system, means responsive to a fluid current for moving said system, a micrometer having a rotatable thimble and a spindle rotatable with the thimble, means for imparting longitudinal movement to said thimble and spindle as the thimble is rotated, a second linear measuring device, a core slidably arranged within said second named measuring device, said linear measuring devices being electrically interconnected to have a common output, a rotatable drum secured to said thimble and movable therewith as the thimble and spindle are rotated by said drum, means including a step-down device in engagement with said core for moving said core proportional to the amount of movement of carriage by said follower and movable thereby for traversing said scale as the follower is moved by said carriage.

7. A measuring device comprising a micrometer having a rotatable thimble and a spindle rotatable with the thimble, threaded means on said spindle for imparting longitudinal movement to said thimble and spindle as the thimble is rotated, a rotatable drum secured to said thimble and movable longitudinally therewith as the thimble and spindle are rotated by said drum, a movable element, a pivotally mounted spindle follower held in abutting engagement with said spindle and connected to said movable element for moving said movable element a proportionally reduced linear distance with respect to the longitudinal distance traversed by said spindle, said follower being linearly driven by the linear longitudinal movement of said spindle to impart reduced linear movement to said movable element, and means including a helical scale on said drum for indicating the amount of movement of said movable element.

8. The device of claim 7 further including in combination therewith, a first linear variable differential transformer having a primary winding and a secondary winding, said primary winding being energizable to develop an induced voltage in said secondary winding, said movable element being a core slidably arranged in said transformer whereby said induced voltage may be varied, a second linear variable differential transformer having a primary winding and a secondary winding, said primary winding being energizable to develop an induced voltage in said secondary winding, an armature slidably arranged in said second transformer for varying the induced voltage therein, an electrical energizing source for energizing said primary windings, a movable system operatively connected to said armature to move said armature an amount proportional to the movement of the system, force responsive means operatively connected to said system for moving said system in response to a force exerted thereon, and an oscilloscope having a horizontal deflection input and a vertical deflection input, said electrical energizing source being connected to said horizontal deflection input to provide the horizontal deflection indication on said oscilloscope, the secondary winding of said first transformer and the secondary winding of said second transformer being connected in series across said vertical deflection input whereby the resultant vector sum of the voltages induced in said secondary windings is indicated by the vertical deflection line produced on said oscilloscope, the vertical deflection being zero and indicating a balanced condition when the voltage induced in the secondary winding of said first transformer is equal to the voltage induced in the secondary winding of said second transformer, said movable element being adustable by rotation of said drum to obtain said balanced condition and the indication on said scale of the amount of movement of said movable element when said balanced condition has been obtained being representative of the magnitude of the force exerted on said force responsive means.

References Cited in the file of this patent

UNITED STATES PATENTS

| | | |
|---|---|---|
| 1,640,464 | Mershon | Aug. 30, 1927 |
| 2,050,629 | Quereau et al. | Aug. 11, 1936 |
| 2,129,984 | Bacon | Sept. 13, 1938 |
| 2,420,539 | Hornfeck | May 13, 1947 |

OTHER REFERENCES

Two Useful Electromagnetic Gauges. Journal of Scientific Instruments. Jan. 1948, pgs. 4–6.